United States Patent Office 3,331,620
Patented July 18, 1967

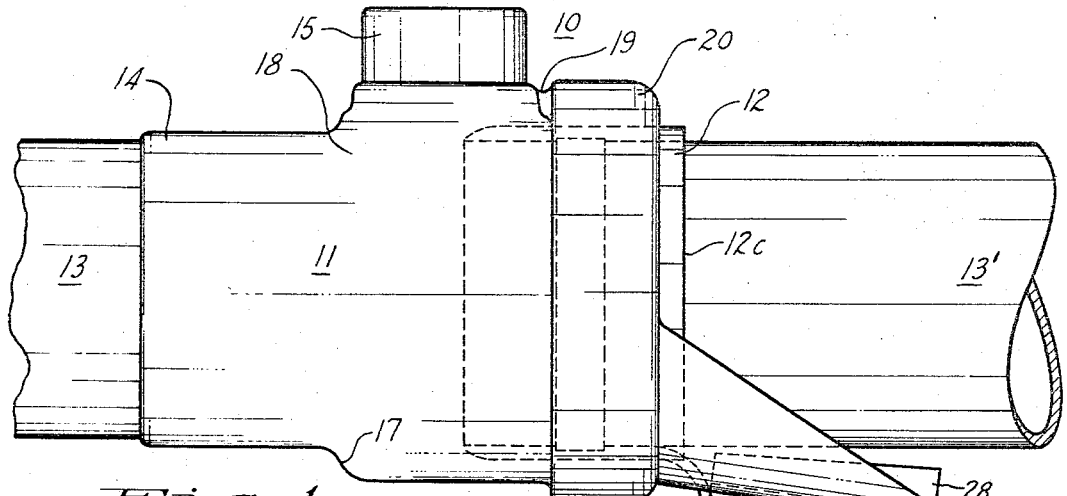
Fig. 1
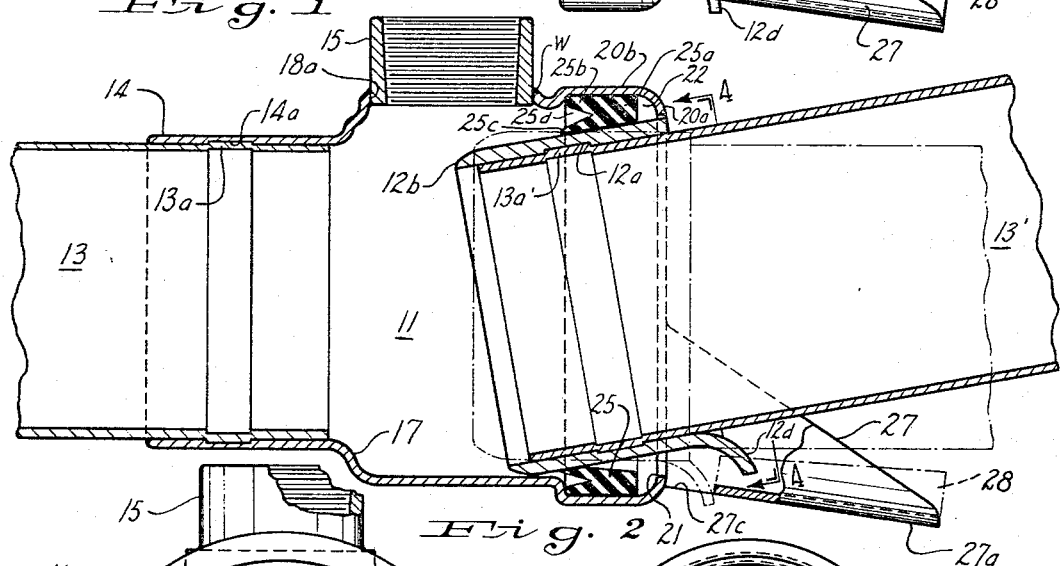
Fig. 2
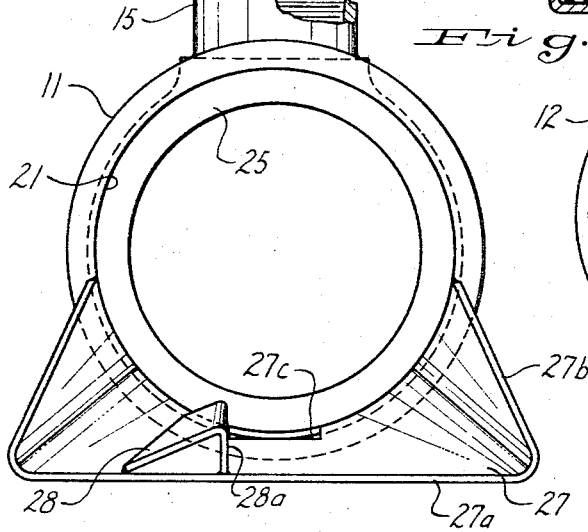
Fig. 3
Fig. 4
INVENTOR.
CLYDE E. RICKARD

3,331,620
CONDUIT COUPLING ASSEMBLY
Clyde E. Rickard, Du Bois, Pa., assignor to McDowell Manufacturing Company, Du Bois, Pa., a corporation of Pennsylvania
Filed July 19, 1966, Ser. No. 566,410
2 Claims. (Cl. 285—5)

This invention relates to interconnecting fittings which are used in combination to cooperatively form a conduit coupling construction or assembly. More particularly, the invention pertains to an improved quick-connect and quick-disconnect coupling device for sealably-joining together cooperating end portions of pipe or conduit lengths, such as of thin wall tubing, to support fluid flow therethrough.

In the past development of so-called quick-release couplings and particularly, in the introduction of various new coupling constructions for use in portable pipeline systems or mobile irrigation equipment, it has been found useful to provide a conduit coupling construction wherein a male member, nose part or fitting may be inserted within or withdrawn from a female member, housing part, body or fitting by a simple substantially longitudinal push-in and pull-out movement.

One such assembly of the prior art has been provided with a housing body supporting therein an operatively-cooperating annular grip coil and annular sealing gasket. The grip coil provides a mechanical interlock that has a force application dependent on the fluid pressure force exerted by the fluid flowing through the pipe or conduit members thus connected.

The present invention deals with providing a positive mechanical interlocking type of coupling assembly that may be tilted or angled into and out of its locking or latching relation.

It has been an object of the invention to provide a practical and foolproof type of tilt latching and unlatching coupling;

Another object has been to devise a quick-release coupling of simplified construction and operation;

A further object has been to provide a fluid-flow tilt coupling that can be easily manually locked and unlocked when there is no fluid flow pressure application and that will resist unlocking movement during the application of positive fluid pressure;

A still further object has been to devise an efficient, effective and practical fluid coupling assembly or construction that requires no tools for latching and unlatching it and that makes use of the weight of a pipe or conduit member to enhance or further its coupling action and a positive directional guide stop to further the coupling operation;

These and other objects will be apparent to those skilled in the art from the illustrated embodiment and the claims.

I have devised a new and improved, quickly assembled and disassembled, latched and unlatched coupling assembly for detachably-connecting together adjacent open end portions of a pair of tubular members, pipes or conduits. In carrying out the invention, an end portion of one of the tubular members to be connected is provided with a housing body or member extending forwardly thereof, and the adjacent end portion of the other of the tubular members is provided with a nose part, member or body for insertion therein. The housing body and the nose part are provided with cooperating latching parts or portions that enable the tubular members to be assembled with respect to each other by tilting one member with respect to the other and inserting or pushing the nose part into the housing body, and then by swinging or pivoting the members into a substantially longitudinally or axially-aligned relation with each other. For diassembly, the operation is reversed and the members may then be pulled-out or separated. It will be noted that the tubular members may rest upon or be supported on a ground surface in their latched or locked relation with each other, and that they will positively retain their interlocking relation until manually released.

It is believed that the invention will find wide acceptance in portable or temporary fluid or liquid piping systems. A typical example of such a system is a so-called "solid set" method of irrigation in which a conduit or piping system is laid across cultivated land after crops have been planted, with sprinkler heads mounted in a spaced-apart relation along the pipeline to furnish water to the soil. In the "solid set" system, the piping may be allowed to remain in position during the entire growing season and not moved until it is time to harvest the crop. During the growing season, the water is turned "off" and "on" repeatedly, placing a strain on the couplings used to interconnect the serially-arranged lengths of members in the system. Thus, a coupling assembly, such as involved in the present construction, having a positive locking feature to assure that it will not separate under internal pressure surges, etc. is needed. An improved coupling, such as herein set forth, can be manufactured at a comparatively low cost, is inherently capable of extremely rapid attaching and detaching manipulation, and in its positively-retained attached position, is capable of retaining the joint between a pair of pipe members in a fully fluid sealed-off connected relationship.

In the drawings,

FIGURE 1 is a side view in elevation of a coupling assembly in accordance with the invention, with the coupling assembly shown in a latching or locked fluid-flow sealing-off position, as utilized to connect ends of a pair of pipe members or conduits for fluid flow communication therethrough;

FIGURE 2 is a side sectional view in elevation of the embodiment as shown in FIGURE 1, illustrating by full lines a tilted intermediate positioning of coupling parts of fittings, involved in either a connecting or detaching operation;

FIGURE 3 is a front end view in elevation of a receptacle part or housing body of the coupling assembly; and FIGURE 4 is a back end view in elevation of a nose part or insertable member of the coupling assembly, taken along lines IV—IV of FIGURE 2, with the conduit on which it is carried removed.

The securing means that I have devised includes a laterally-projected portion on the back end of the assembly's nose part which is manipulated to pass through an opening in a projected portion that extends outwardly and forwardly from the front end of the housing part. The coupling assembly is designed so that when the nose part is initially inserted into the housing part, the nose part is in a canted or axially angled orientation with respect to the longitudinal axis of the housing part. The coupling operation is then completed by moving the nose part substantially within the open end of the housing part, and then re-orienting the nose part so its axis assumes a substantially horizontal position, whereby the nose part projecting portion moves downwardly to extend through the opening in the housing part projected portion and positively interlocks the major parts of the coupling assembly.

Means for stabilizing the coupling assembly so that inadvertent axial rotation is prevented is achieved by constructing the projected portion on the housing part with a substantially wide outer end configuration whereby a pedestal-like stabilizing base is formed to support the coupling assembly thereabove.

Where a plurality of my coupling assemblies are utilized to couple serially-arranged conduit lengths to form a pipeline system, the stabilizer on each coupling assembly will cooperate with those of the other assemblies in the system to support the entire pipeline arrangement or system substantially parallel to the terrain on which the system rests.

As shown in FIGURES 1 and 2, conduit coupling assembly or device 10 has two major coupling parts, namely, a housing body part, receptacle member or female fitting 11, and a tubular nose part, male fitting or sleeve-like tubular member 12 that is adapted to somewhat loosely fit within the housing body part 11. The housing body part 11 has a sleeve-like or annular back end portion 14 for sealably-securely-receiving a forward open end portion of one tubular member, conduit or pipe 13. The back end portion 14 is flared radially-outwardly at its forward end to form an offset or shoulder portion 17 with an enlarged, forwardly-extending main housing portion 18 that has a front open end or mouth to receive the nose part 12.

For the addition of an auxiliary fluid outlet means such as a sprinkler head, the main housing portion 18 may be pierced through its side wall to provide a side or top opening or hole 18a to mount a half section of an interiorly-threaded standard pipe coupling 15. The pipe coupling 15 may be secured on the housing portion 11 by means of a circumferential metal weld head w.

The main body portion 18 of the housing part 11 has a collar-like forward end portion 20 that is connected thereto by a radially-inwardly projecting, rounded, annular shoulder 19 and that, at its forward open end, has a radially-inwardly projecting, inwardly-turned rounded end flange or lip 20a. The shoulder 19 and flange 20a define a gasket-receiving and retaining recess, throat or groove 22 with an intermediate cylindrical portion 20b adjacent the mouth opening at the forward end of the part 11. As shown in FIGURE 2, a fluid-pressure sensitive, flexible annulus or resilient gasket 25 of V-shape and of rubber-like material is fit within and carried by the throat or recess 22.

The tubular nose part 12 has an outer diameter less than the diameter of the mouth opening 21 of the housing 11 and slightly greater than the inner diameter of the annulus 25. As shown in FIGURE 2, the annular spacing between the nose 12 and a forward guide lip edge 21 of the flange 20a is sufficient to provide for tilting or angular movement between conduit or pipe members 13 and 13'. The front edge or end portion 12b of the nose part 12 is shown sloped or beveled to facilitate its insertion and removal from a slide fit within the inner periphery of the gasket 25 and to facilitate its insertion into and removal from the housing 11.

The resilient sealing gasket or annulus 25 is shown as a fluid pressure-responsive type that will increase its sealing action in accordance with the fluid pressure exerted within its annular V-shaped chamber 25d. The gasket 25 has a base or heel portion 25a and a pair of opposed leg portions 25b and 25c that extend backwardly from the heel portion 25a and may have feathered edges. The leg portions 25b and 25c taper to define the annular V-shaped chamber 25d therebetween that is open backwardly of the gasket. Insertion of the nose part 12 within the housing part 11 exerts compression force on the gasket 25 to resiliently deform it between the nose and the portion 20b to provide an initial fluid seal for the joint. When the coupling is fully assembled, fluid pressure exerted within the chamber 25d furthers the fluid sealing action.

As shown in FIGURE 2, housing body 11 may be secured in a tight sealed-off relation on an end portion of one conduit member 13 by press-fit, complementary, annular band and groove portions 13a and 14a, and nose part 12 may be secured in a similar manner by corresponding portions 13a' and 12a to the other conduit member 13'.

Extended from the front or forward end of the housing body part 11, as an integral projection thereof, is a rigid, scoop-shaped stabilizer member 27. The stabilizer 27 is shown of semi-circular configuration adjacent the lower periphery of the flange portion 20a, flares laterally-outwardly and downwardly at an angle with respect to the longitudinal axis of the housing 11 and conduit 13, and terminates forwardly in a planar or flat bottom face, pan or supporting base portion 27a. As shown in FIGURE 3, the lateral dimension across the forward end of the base portion 27a is greater than the diameter of the housing body part 11. Side wings 27b reinforce the construction and mounting of the stabilizer 27 which has a pedestal-like base structure for supporting the coupled assembly.

Extending longitudinally-backwardly in a curved configuration from the back end of the tubular nose part 12 is a downwardly-projecting, tab-like latching or locking tongue or lug 12d (see FIGURES 1, 2, and 4). As shown in FIGURE 2, the lug 12d slopes or is rounded to curve or arc backwardly-downwardly from the periphery of the back end of nose part 12. The latching lug 12d is designed to cooperatively function with a slot-like or open latching or locking portion 27c (see FIGURES 2 and 3), located centrally in the substantially planar bottom face portion 27a of the stabilizer pan or base portion 27a immediately adjacent and extending forwardly from the flange 20a of the housing body 11. The portion 27c cooperates with the lug portion 12d to guide it in its angular movement and to retain it in a latched or locked "down" position. As shown in FIGURES 2 and 3, the latching slot portion 27c extends longitudinally-forwardly from the peripheral forward end of the housing body part 11, and, as shown particularly in FIGURE 3, has one side edge in alignment with vertical side part 28a that, as shown in FIGURES 1 and 2, extends longitudinally along and from the front end of the bottom face portion 27a to such latching slot portion. As particularly shown in FIGURES 3 and 4, the latching slot portion 27c has a lateral extent or width only sufficient to receive the width of the latching lug 12d therein; as a result, when the nose part 12 is in its latched position of FIGURE 1, relative turning or rotational movement of it with respect to the housing body part 11 is prevented. As shown in FIGURES 1 and 2, the curved, arcuate portion of the latching lug 12d is also, at this time, in sliding-pivotal engagement with the back edge of the latching slot portion 27c to limit and control relative backward movement of the nose part 12. It will be apparent that the application of a sudden separating force between the nose part 12 and the coupling part 11, such as may be exerted upon an initial application or surge of fluid pressure applied to the coupling, will tend to move the conduit 13' and its nose part 12 angularly-backwardly with respect to the housing body part 11 and provide a flexible "give" to the force application. Such a force application will tend to pivot the lug 12d downwardly on the edge to increase the latching depth of the lug 12d within the latching slot 27c and thus, further the locking or latching engagement therebetween.

As shown by the full line position of FIGURE 2, the coupling action may be accomplished by first inserting the forward end portion 12b of the nose part 12 through the mouth opening of the housing 11, with the tubular nose part in a tilted or angular position with respect to the housing 11, such that the axis of the nose part 12 forms an obtuse angle with the axis of the housing part 11. The angular tilt between the conduits 13 and 13' is then decreased, with the latching lug 12d being guided in its "down" movement by the latching slot portion 27c. When the conduits reach a substantially longitudinally aligned position with respect to each other, the front edge of the slot portion 27c rests in alignment with convex upper connecting shoulder of the lug 12d. As a result, when the nose part 12 and the conduit 13' are given a slight outward pull with respect to the conduit 13 and the housing body 11, there will be an effective latched or locked relation therebetween. An application of fluid pressure that would normally tend to push the conduits 13 and 13' out or separate them with respect to each other, only furthers the locking action. An angular-shaped, upwardly-projecting guide wing 28 enables the lug 12d to be aligned in exact longitudinal or axial alignment with the slotted portion 27c and positively-directionally guides it longitudinally in its movement into, out of and along the slotted portion and thereby eliminate any need for turning movement of the nose part 12 with respect to the stabilizer part 27 and the housing body part 11 to assure latching engagement when the nose part is inserted into the housing body part. The forward-downward slope of the pan 27a permits a slight angularity in the latched or joined connection between the conduit members 13 and 13' to allow for irregular contour of the ground on which they may rest.

As the nose part 12 is inserted, the lug 12d may strike a forward end of the lip 20a to limit the distance of insertion of the nose part 12 within the housing 11. At this time, the lug 12d is in an overhanging position above the slot-like portion 27c. Lowering the elevated end of the conduit 13' will cause the end of the lug 12d to pass into the portion 27b. Guide wing 28 (see particularly FIGURE 3) is secured on the stabilizer 27 with its guide face 28a in alignment with a side edge of the latching slot portion 27c. The guide wing 28 is shown constructed as an angle bar extending longitudinally along the length of the bottom face portion 27a of the stabilizer, the intention being to provide a positive rotation-preventing stop guide surface or vertical side part 28a to frictionally engage a side edge of the lug 12d and direct it towards the slot portion 27c. There is thus no need to "hunt" the slot portion 27c. With the nose part 12 in its installed coupled position, the lug 12d acts as a positive interlock to prevent longitudinal separation of the coupling assembly, as well as rotational movement between the conduit members 13 and 13'. Only an easily-manipulated detachment operation is necessary to separate the coupling parts from each other.

Inherent in the construction of the securing means of my coupling assembly 10 is its adaptivity to varying topography without interfering with the effectiveness of the positive interlock. It is recommended that the coupling assembly 10 be constructed to require at least about 5° angulation of the nose part 12 relative to the housing 11 to permit the lug 12d to move upwardly out of its engaged relationship with the slotted portion 27c for withdrawal. Employing the coupling construction of the present invention, a joint can be connected and disconnected in a fraction of the time required with conventional couplings. When desired, a particular pipe or conduit length of a pipeline system can be quickly and easily manipulated without disturbing the rest of the line, since the detachment operation can be performed by manipulating the end of one or both of the joined conduits 13 and 13'.

The coupling assembly 10 is simply and inexpensively constructed and there are no loose and easily misplaced latching parts to pick up or assemble to complete the coupling action. The resilient annulus 25 is operatively carried within the housing 11, and may be of a suitable resilient resin material which may be oil-resistant when the coupling is to be used for gas and oil lines. Once positioned within the housing 11, the annulus 25 fits snugly and avoids inadvertent dislodgment. The coupling assembly is particularly suitable for the utilization of relatively thin wall conduits, in that the housing 11 and nose part 12 serve as reinforcing sleeves or collars on the ends of the conduits to which they are secured.

With respect to the ability of my coupling assembly 10 to permit a pipeline system to adapt to varying topography, it is understood that the construction of the coupling assembly 10 may be modified to also permit the conduit 13' to be angularly positioned or tilted through a horizontal plane with respect to the conduit 13. Thus, when laying a pipeline, obstructions directly in its path may be avoided and by-passed. In adapting the assembly to permit such off-to-the-side movement of a conduit length, the slot-like portion 27c shown in FIGURE 3 would have a lateral dimension or length somewhat greater than the distance across the broad surface of the tab-like lug 12d. Then with the nose part 12 in its operational position with respect to the housing part 11, the lug 12d would be able to move in a limited area or lateral path within the slot-like portion 27c to allow the conduit 13' to be swung for a limited distance in a horizontal plane with respect to the conduit 13. By allowing for both horizontal and vertical angular position of the conduit 13', the assembly 10 takes on the characteristics of a universal joint.

It should also be observed that the downwardly-forwardly sloped bottom face portion 27a of the stabilizer pan 27 will serve the additional purpose of limiting the degree of tilt of the conduit 13' in a downward direction. When the conduit 13' is tilted, with its outer end moved downwardly with respect to the housing part 11, the lower side wall of the conduit 13' will contact the upper edge or surface of the guide wing 28a to limit the downward movement. The inclined surface of the stabilizer pan 27 will serve to limit the downward tilt or angular positioning of the conduit 13'.

I have heretofore shown and described a preferred embodiment of my invention for the purpose of illustration without intent of limitation thereto. It will be understood that the illustrated construcion may be varied by hose skilled in the art without departing from the spirit of the inventive concept and the scope of the appended claims.

What I claim is:

1. In a quick-release push-in pull-out type of coupling assembly for detachably-securely-connecting together adjacent open end portions of a pair of fluid conduits wherein, a hollow tubular housing part is sealably-secured on a forward end on one of the conduits and has a forward open end portion defining an open mouth, a tubular sleeve-like nose part is sealably-secured on a forward end portion of the other conduit for insertion at its forward end into the open mouth of the housing part and for tilting in an angular orientation into and out of latching engagement with the housing part, resilient annular means is carried within the housing part adjacent the open mouth for providing a fluid-type seal with and about the nose part, the improvement which comprises: a scoop-like stabilizer pan extending axially outwardly from a bottom portion of the housing part, said stabilizer pan having a substantially planar bottom face portion longitudinally therealong provided with a latching slot portion open therethrough adjacent the juncture of the housing part and pan, an angular-shaped positive guide stop secured to and extending longitudinally along and from a front end of said bottom face portion to said latching slot portion and having a vertical side part along its length in longitudinal alignment with a side edge of said latching slot portion, a tab-like latching lug secured to the back end of said nose part, said lug extending generally along the axis of said conduit and curving downwardly and radially outwardly of the outer surface thereof, said latching lug having a side edge adapted to engage a front end portion of said vertical side part of said guide stop and slide forwardly therealong in positive alignment with and into latching engagement within said latching slot portion when the nose part is longitudinally-inserted within the open mouth of the housing part and, in such a manner as to positively prevent rotation of the nose part in the direction of said guide stop during insertion of the nose part within the housing part, and said latching lug in its latching engagement within said latching slot portion having a tangential engagement with a front edge defining said latching slot portion, whereby an application of longitudinal-outward separating force on the other conduit will tend to move said latching lug further within said latching slot portion.

2. In a coupling assembly as defined in claim 1 wherein, said stabilizer pan defines a side-extending positioning support for a bottom portion of the housing part, and said bottom face portion has an angular slope forwardly-downwardly along its length from the housing part, whereby the other conduit and its nose part may be positioned in a downward angular relation with respect to the housing part and the one conduit when said latching lug is in latching engagement within said latching slot portion.

References Cited

UNITED STATES PATENTS

| | | | |
|---|---|---|---|
| 2,508,716 | 5/1950 | Hauf | 285—5 |
| 2,806,717 | 9/1957 | Hempel | 285—5 |
| 3,162,469 | 12/1964 | Shohan | 285—5 |

FOREIGN PATENTS 604,378  5/1960  Italy.

CARL W. TOMLIN, *Primary Examiner.*

D. W. AROLA, J. L. KOHNEN, *Assistant Examiners.*